United States Patent [19]

Kabele

[11] 4,272,224
[45] Jun. 9, 1981

[54] SPLINED SHAFT DRIVING ARRANGEMENT

[75] Inventor: Walter A. Kabele, Piqua, Ohio

[73] Assignee: Roper Industries, Inc. (Ohio), Piqua, Ohio

[21] Appl. No.: 936,719

[22] Filed: Aug. 25, 1978

[51] Int. Cl.³ .................. F04B 17/00; F04B 39/02
[52] U.S. Cl. .................................. 417/360; 417/364; 74/15.63; 403/38; 403/359
[58] Field of Search ................. 412/360, 364; 403/37, 403/38, 39, 359; 123/198 C; 74/15.63

[56] References Cited

U.S. PATENT DOCUMENTS

| | | | |
|---|---|---|---|
| 276,195 | 4/1883 | Sargood et al. | 403/38 X |
| 2,278,997 | 4/1942 | Knight | 403/39 X |
| 3,290,918 | 12/1966 | Weasler | 403/359 X |
| 3,491,696 | 1/1970 | Howard | 417/360 X |
| 3,873,242 | 3/1975 | Anderson | 417/360 |
| 3,889,489 | 6/1975 | Casey et al. | 403/39 X |
| 3,927,954 | 12/1975 | Walker | 417/360 |

Primary Examiner—Richard E. Gluck
Attorney, Agent, or Firm—Jerome P. Bloom

[57] ABSTRACT

A drive coupling, as between an engine and a pump, facilitating assembly of the pump to the engine and preparation of the engine-pump combination for operation. Elements of the coupling include a relatively projecting externally splined shaft associated with the pump and an internally splined hub associated with the engine, the two being brought to a telescoping, interfitting relation as an inherent part of an action properly relating the pump to the engine. A shaft support assembly provides for a temporary fixing of the shaft against off center movements while it is being introduced into the hub. The hub is made a part of a separable coupling plate assembly fastened directly to the engine flywheel preparatory to a coupling of the pump to the engine. The splined connection within the hub is lubricated according to a concept substantially precluding loss of lubricant during operation of the drive coupling but providing for escape of lubricant supplied in excess of that required.

23 Claims, 4 Drawing Figures

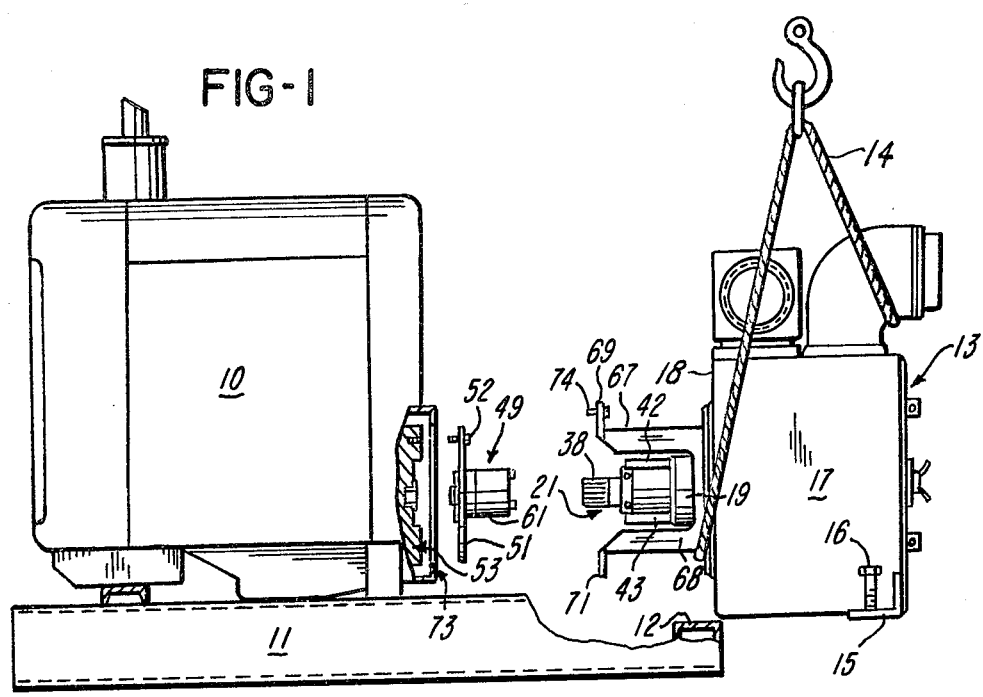

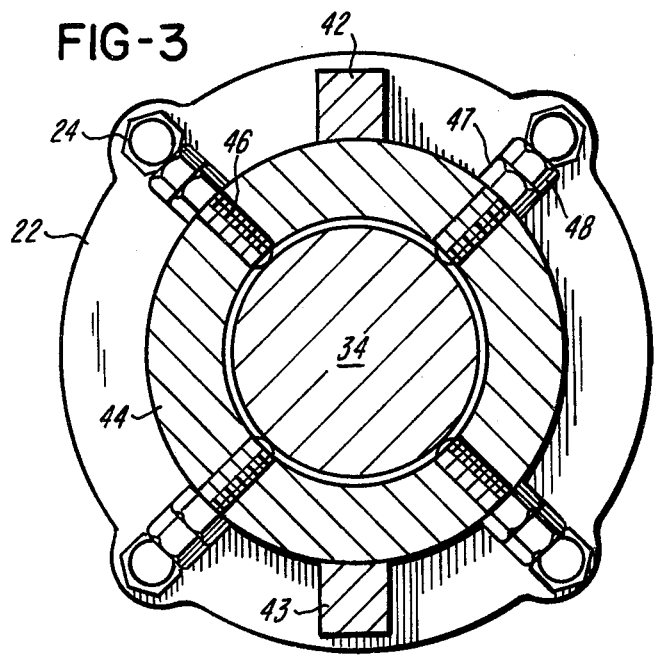
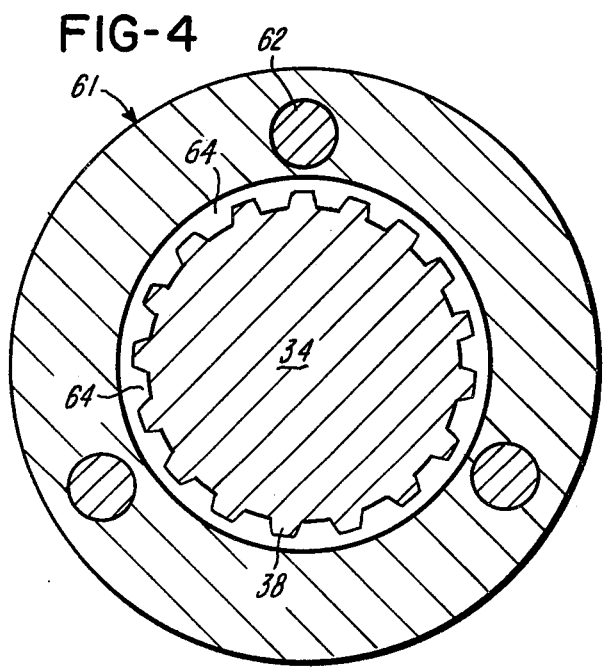

SPLINED SHAFT DRIVING ARRANGEMENT

BACKGROUND OF THE INVENTION

This invention relates to drive couplings, particularly although not necessarily those direct driving a pump from an engine. The invention has especial, though not limited, application to engine-pump combinations of a unitary type adapted for on-site or in-the-field use, as for example for sanitary and sump pumping.

Engine-pump combinations are known in the art wherein the engine and pump mount in a generally side by side or tandem relation coupled together by interconnecting driving and driven elements. The bringing together of the engine and pump components into an operating combination, particularly the mounting of a pump in an operative, driven relation to an existing or previously installed engine, can be a difficult procedure. This is especially true where the work is to be done under field conditions, without use of factory equipment and by persons having limited skills of the kind required. Serious problems of alignment are inherent in the mating of driving and driven elements of the drive coupling, and in this and other respects the assembling and preparation of an engine-pump combination for use has been an imprecise, generally unsatisfactory procedure. Pump manufacturers have not been able properly to respond to a need for a pump unit which can readily be connected in the field to a variety of engines and achieve therewith a satisfactory mounting and driven relationship. There has, prior to this invention, not been available in the pumping arts a pump specifically adapted to and lending itself to accurate, trouble free installation in connection with a driving engine.

The foregoing is a complete account of pertinent prior art, insofar it is known to those substantively involved in the preparation of this application.

SUMMARY OF THE INVENTION

The instant invention has in view a generally new drive coupling enabling and facilitating the bringing of a pump into a mounted, driven relationship with an engine. A pump unit, in accordance with one invention aspect, includes a projecting shaft adapted to achieve a connected relation with an engine mounted coupling portion as an inherent function of bringing the pump and engine into a cooperative relation with one another. Further included in the pump unit to be an integral part thereof is a releasable means to fix the shaft against off center movements while it is being engaged with the engine mounted coupling portion. A pump unit, in accordance with this invention aspect, is equipped with a shaft support assembly incorporating the releasable shaft fixing means. In another aspect thereof, the invention makes the engine mounted coupling portion a part of a coupling plate assembly useful in connection with the pump unit and adapted to be mounted directly to the engine flywheel. A coupling plate assembly, supplied with a pump unit, adapts the supplied unit to a variety of engines and insures a precise mating interengagement of the pump shaft and engine mounted coupling portion.

In still another aspect, the invention provides for a splined interengagement of the pump shaft and engine mounted coupling portion, the arrangement being one in which the pump shaft has a relatively close bearing engagement with the engine coupling portion. There is thus achieved a centering fit of the pump to the engine, obviating a need for machined joints as between a housing extending from the pump unit and an engine flywheel housing. With particular respect to the splined connection between the pump shaft and the engine mounted coupling portion, the invention provides a means of lubricating such connection which includes formation of a lubricant chamber. Related structure includes means defining a route of escape from the lubricant chamber for lubricant supplied in excess of that required for lubrication. The structure operates to such effect that loss of lubricant by way of the escape route, during operation of the drive coupling, is substantially precluded.

An object of the invention is to provide a drive coupling, as between an engine and a pump, characterized by a simplified manner of completing the coupling, useful particularly in an in-the-field installation of a pump in connection with an engine already in place.

Another object of the invention is to enable a pump manufacturer to build and supply pump-only units, as distinguished from engine-pump combinations, which can be installed in the field on and in connection with a variety of engines and have a satisfactory mounting and driven relationship therewith.

A further object of the invention is to provide for a centering fit of a pump shaft relatively to an engine mounted coupling component which obviates a need for precision interfitting of pump and engine housing portions.

Still another object of the invention is to provide a means of lubricating a drive coupling in which excess lubricant pressure is relieved, without, however, allowing lubricant to be lost during operation of the drive coupling.

A still further object of the invention is to provide an adapter means facilitating the mounting of a pump unit in a driven relationship to a variety of engines, the adapter means being applicable directly to the engine flywheel.

Still another object of the invention is to equip a pump unit with releasable means positively to center a pump shaft in conjunction with a mounting of the pump unit in a driven relationship to an engine.

A still further object of the invention is to provide a generally new splined drive arrangement, in a drive coupling, as between an engine and a pump.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings, wherein is shown one but not necessarily the only form of embodiment of the invention, FIG. 1 is a view in side elevation, and partly diagrammatic, showing a manner of mounting a pump to an engine in accordance with aspects of the invention;

FIG. 2 is a detail view in longitudinal section, and enlarged relatively to FIG. 1, showing a drive coupling between the engine and pump units, reversely oriented with respect to the showing in FIG. 1 and limited to pertinent portions thereof;

FIG. 3 is a view in cross section, taken substantially along the line 3—3 of FIG. 2, and relatively enlarged; and FIG. 4 is a view in cross section, taken substantially along the line 4—4 of FIG. 2, and relatively enlarged.

Like parts are indicated by similar characters of reference throughout the several views.

Referring to the drawings, a pump unit with a drive coupling according to the illustrated invention embodiment allows a pump-only unit, as distinguished from a pump-engine combination, to be conveniently installed in the field in a satisfactory mounted and driven relation to an engine.

Thus, and as seen in FIG. 1, an engine 10 is shown in an on-site location supported on a frame or skid 11. The frame 11 provides also a resting place 12 for a pump unit 13 to position in an adjacent, opposed relation to the engine. Together, the engine 10 and pump 13 comprise an engine-pump combination, with the pump being driven by the engine and suitably connected to carry out various selected pumping functions. In the illustration of FIG. 1, the pump unit 13 is shown carried by a sling 14 and being maneuvered to a position along side or opposed to an engine 10 already in place on the frame 11. When a proper position of the pump over the frame 11 has been achieved, a pump foot 15 superimposes over resting place 12. Shims are applied, as required, between foot 15 and place 12, and bolts 16 (one shown) are installed. Upon sling 14 being removed, the weight of the pump is allowed to be sustained by the frame 11, and the pump is fixed relatively to the engine. In the act of properly positioning the pump relative to the engine, as will hereinafter more clearly appear, a drive coupling between the engine and pump is inherently completed.

Considering the drive coupling in more detail, and referring to FIG. 2, the pump 13 includes a housing 17 formed in part by an end wall 18. Wall 18 has a cylindrical boss 19 defining a through opening for a pump drive shaft 21. What may be regarded as an outer end of boss 19 has superimposed thereon an annular closing plate 22. Similarly, an annular closing plate 23 seats to wall 18 in a superimposing relation to what may be regarded as the inner end of boss 19. Sets of bolts 24 and 25 (one each of which is shown) mount respective plates 22 and 23 to opposite ends of the housing boss. The boss 19 has an internal rib 26 cooperating with plate 22 defining a chamber receiving a circular rolling bearing means 27. Closure plate 23 cooperates with internal rib 26 in defining an interior space to receive a shaft seal 28. An intermediate portion 29 of the shaft 21 has a diameter to be closely surrounded by the inner race of bearing means 27 and by the shaft seal 28.

The shaft 21 extends in opposite directions through and beyond boss 19. What may be regarded as an inner end portion 31 thereof projects from intermediate portion 29 into the pump interior. A pump impeller 32 has a keyed connection to shaft portion 31 and is held thereon by means including an applied nut 33. Extending in the opposite direction from intermediate portion 29, the shaft 21 projects through and beyond closure plate 22. A relatively larger diameter portion 34 projects immediately from portion 29 and forms therewith a shoulder 35 to abut the inner race of bearing means 27. Beyond portion 34, the shaft 21 is again reduced in diameter and forms a projecting portion 36 in which is a circumferential groove 37. Beyond groove 37 is what may be regarded as an outer extremity of the shaft and this portion is formed with a continuous circumferential series of splines 38 of longitudinal extent.

As indicated in FIG. 4, in the preferred embodiment of the invention the splines or splined teeth 38 have a true involute configuration.

The outer race of bearing means 27 is confined by a circular projection 39 on an inner face of plate 22 to what may be regarded as a shoulder formed by a counterbore in the open outer end of boss 19. Assisting in a positioning of the bearing means is an abutment ring 41 positioning in a peripheral groove in shaft portion 29. Plate 22 positions to the front of and in a protective relation to bearing means 27. An inner periphery thereof is in an approaching relation to shaft portion 34 and is grooved to mount dust seals or the like. Projecting from diametrically opposed locations on a front face of the mounting plate 22 are bars 42 and 43. The bars 42 and 43 are in end abutting relation to the plate 22 and are welded or otherwise fixed thereto. The bars extend perpendicularly of plate 22 in a parallel relation to one another and in a substantially parallel, spaced relation to the shaft portion 34. At their outer ends, the bars 42 and 43 support between them a ring member 44 which surrounds shaft portion 34 in a relatively closely spaced relation thereto. The ring member 44 is fixed as by welding to the bars 42 and 43 and has formed therein a circumferential series of radially orienting internally threaded apertures 45. Threadedly engaged in each aperture 45 is a screw 46. Each screw 46 projects through and beyond an outer periphery of ring member 44 and carries a head 47, as well as threadedly mounting a lock nut 48. An inner end of each screw 46 has a blunt configuration and is adapted to make peripheral contact with portion 34 of the pump shaft 21. It will be evident that screws 46 have the character of set screws and that they may be adjusted axially inwardly conjointly to engage the pump shaft. The set screws are provided in diametrically opposed pairs and it will accordingly be evident that by precision adjustment thereof the pump shaft may be caused to assume and to maintain a true center line in the axis of boss 19. Also, and as will further be evident, the set screws 46 adapt themselves to a backing off from engagement with the pump shaft so as not to inhibit a free rotation thereof. Lock nuts 48 are adjustable to hold the set screws in selected positions of longitudinal adjustment. The plate 22, bars 42-43 and ring member 44 with its mounted set screws 46 comprise a closure plate and shaft support assembly. By means of the bolts 24, the defined assembly is fixed to and becomes an integral part of the pump unit 13. The assembly may be regarded as a part of the drive coupling, in that it provides a means positively to fix the rotary pump shaft against off center motion while the shaft is being introduced into mating coupling means in the process of assembling the pump unit to the engine. Shaft 21 projects well beyond the bearing means 27. The support provided by ring member 44 and its set screws 46 occurs in a longitudinally spaced relation to the bearing means and effectively locks the shaft in a centered position as defined by the bearing means.

Coupling means to mate with pump shaft 21 is provided in the form of a coupling plate assembly 49. The assembly 49 includes an annular plate portion 51 fastened as by screws 52 to a front face of an engine flywheel 53. The latter, it will be understood, is an integral part of the engine 10 and in the operation of the engine is positively driven in a rotary sense. The flywheel 53 is made to automotive and like standards and will in each of a variety of engines have a forwardly orienting face to which plate 51 may be applied in a flush mating engagement. Through peripheral apertures 55 in the flywheel allow for an installation of bolts 52. The coupling plate assembly includes also a centrally positioned cylindrical body portion 56 which may be appropriately welded in and to the plate 51, or formed integrally therewith. Projecting from the rear of body portion 56 is a cylindrical projection forming a pilot means 57 adapted to be received in a recess 58 in the flywheel, positively to center the plate assembly 49 relative to the flywheel. The body 56 which projects oppositely of pilot means 57, in a sense forwardly of plate 51, is cut away at its projected end surface to define an annular recessed shoulder surface 59. A cylindrical tubular hub member 61 is in end seating engagement with surface 59 and projects perpendicularly therefrom. A counterbore defining a recess in the seating end of member 61 and a mating projecting portion of body 56 cooperate in a positive centering of the hub member relatively to the body. Elongated bolts 62 extend lengthwise through hub member 61 and anchor in body 56, holding the hub member as a fixed part of the coupling plate assembly 49.

The hub member 61 accordingly positions perpendicularly of flywheel 53, projecting outwardly of or away from engine 10. An inner end thereof is closed by body 56. An opposite or outer end is open and forms an entrance end. Internally, the hub member has a cylindrical surface 63 extending from its entrance end a short distance toward the closed inner end. Beyond surface 63, toward its closed inner end, the hub member interior presents longitudinally extending projected splines or spline teeth 64. The splines 64 have an involute configuration and are structured for a substantially mating relation with shaft splines 38. It will be understood, in this connection, that the splined exterior of shaft 21 and the splined interior of hub 61 are adapted for an interfitting relation placing the respective splines 38 and 64 not only in a rotary driving-driven relation but in a substantially continuous bearing contact as well.

The splined shaft 21 and the splined hub 61 are parts of a drive coupling effected or completed substantially as indicated in FIG. 1. Thus, with engine 11 already in place, and set screws 46 turned inward to fix the position of shaft 21, pump 13 is suspended by sling 14 from an overhead crane or hoist and advanced upon the engine. This motion is utilized to introduce the splined projecting end of shaft 21 into the entrance end of hub 61, the coupling plate assembly 49 having been previously fixed to the flywheel 53. Advancing movement of the pump is continued and a telescopic engagement of the shaft and hub results, in the course of which movement splines 38 and 64 reach a sliding, bearing contact with one another. The arrangement provides for an interfitting relationship of the spline teeth creating a rotary driving-driven relationship between the shaft and hub. The arrangement further places splined portions of the shaft and hub in a relatively long bearing contact with one another, providing a centering fit of the shaft within the hub and thereby a centering relationship of the pump to the engine. It is not intended, however, that the pump should be supported by the connection afforded by shaft 21 and hub 61. Thus, the pump continues to be suspended by sling 14 until pump foot 15 overlies frame rest 12 and is bolted thereto, appropriate shims being inserted as may be required.

A direct connection between the engine and pump housings also is contemplated, by means extending in generally protective relation to the drive coupling. An annular plate 65 has a recessed fit in pump end wall 18 and is suitably fixed thereto, as by bolts 66. From the inner periphery of plate 65, there projects a pair of segmental housing extensions 67 and 68. These are arcuate in cross section and orient generally parallel to shaft 21 in a diametrically opposed relation to one another. In a circumferential sense they are spaced apart a distance allowing access between them to set screws 46. At their outer ends the segmental extensions 67 and 68 have respective outturned flanges 69 and 71. An intermediate housing as represented by plate 65 and segmental extensions 67 and 68 is a fixed part of the pump 13 as brought to and applied to the engine. As shaft 21 is introduced into hub 61, flanges 69 and 71 move into an approaching and finally contacting relation with an inturned flange 72 on a flywheel housing 73. The centering fit as achieved by the splined shaft within the splined hub brings bolt holes in flanges 69 and 71 into alignment with bolt holes in flange 72, whereupon bolts 74 are introduced and tightened to clamp the intermediate housing to the flywheel housing. The latter being a fixed part of the engine structure, the intermediate housing rigidly interconnects the pump and engine, protecting the drive coupling and further relieving it of stresses which may be applied in use and handling of the engine-pump combination. It will be observed that because of the self-centering engagement of the shaft 21 in the hub 61 it is unimportant and unnecessary that interengagement of the intermediate housing and the flywheel housing be relied upon to center the drive coupling. A use of closely machined joints, and the like, between interconnected housings, is not required. After the intermediate housing has been fastened to the flywheel housing, or after the pump unit has been installed upon resting place 12, or both, the set screws 46 are loosened by being backed out of contact with shaft 21, thereby releasing the pump shaft for rotation.

Returning to a consideration of the drive coupling, the annular groove 37 in shaft portion 36 receives an O-ring seal 75. Upon shaft portion 36 being inserted in hub 61, seal 75 enters cylindrical portion 63 and is compressed thereby. The entrance end of the hub may be chamfered, as shown, to facilitate a movement of the seal into the hub. With the parts of the drive coupling in a telescopic interengaged position, as shown in FIG. 2, seal 75 occupies a position in hub portion 63 and cooperates with body 56 in defining an interior hub chamber 76. Meshing splines 38 and 64 occupy chamber 76, and a radial port 77 communicates therewith. In port 77 is a fitting 78 useful in introducing a lubricant such as grease under pressure into chamber 76. Lubricant forced into chamber 76 is denied escape by seal 75 from the entrance end of the hub and is compelled to flow along the meshing splines 38 and 64 toward the closed end of the hub. The splined connection between the hub and shaft is thereby effectively lubricated. At the closed end of the hub, or at what may be regarded as the bottom thereof, body 56 has a longitudinal bore 79 which extends only a part way therethrough. A hole 81, drilled or otherwise formed from the periphery of body 56, communicates at its inner end with the inner end of bore 79. Bore 79 and its communicating hole 81 comprise a continuously open relief passage for lubricant supplied in excess of that required to fill chamber 76 and provide adequate lubrication for the drive coupling. Bore 79 is located, however, substantially in the axis of the hub 61. In the operation of the coupling, therefore, the relief bore is out of any path taken by contained lubricant under the influence of centrifugal force. Thus, rotation of the coupling urges the lubricant radially outwardly in chamber 76, away from the axially locating bore 79. An unwanted loss of lubricant through the relief passage during operation of the pump is accordingly substantially precluded. Telescopic motion of shaft 21 into hub 61 may be limited, as by abutment of the housing flanges 69 and 71 with the flywheel housing, to leave flow area beyond the shaft at the bottom of chamber 76 for lubricant to reach bore 79.

The invention makes it possible for a pump manufacturer to supply a pump unit which can be quickly and easily substituted in an engine-pump combination. The coupling plate assembly 49 may, in this connection, be supplied with a substituted pump unit and so have the character of an adapter, allowing a supplied pump unit to be applied to a variety of engines. As noted, an engine flywheel is constructed to industry standard specifications, making a single assembly 49 applicable to the flywheel of different engines. The supplied pump unit is installed without alignment problems as an inherent part of the assembly process. Preparations for operation, including lubrication of the splined connection, and relatively rigid mounting of the pump unit to the engine and supporting frame are easily carried out. The set screws 46 provide a convenient, effective means to insure that shaft 21 makes an accurate, precise entry into hub 61. Thus, while the pump unit is being prepared for mounting to the engine, screws 46 are tightened down upon the shaft 21. The arrangement is one to fix the shaft in its entire length within the axis of bearing means 27 and to obviate wobbling or off center movements of the outer end of the shaft. In this enforced, precise alignment, the pump shaft is inserted into hub 61 and makes a long, single bearing contact therewith, achieving the centering fit above discussed. When installation is complete, the set screws are accessible between segmental housing extensions 67 and 68 and can easily be backed off out of engagement with the shaft. The engine-pump combination is then conditioned for a true, positive drive from the engine flywheel 53 to the pump impeller 32. During operation, the shaft 21 is supported by the bearing means 27 and by its bearing contact in hub 61 to maintain a position of axial alignment with opposing pump and engine parts.

While in the preferred embodiment illustrated splines 38 and 64 are specified as true involute, the invention does contemplate that in less desirable embodiments the splines need not be so limited. An important fact to be kept in mind, however, is that in using the true involute splines not only are they conducive to shaft alignment but they do provide a natural self centering of the parts and they will maintain a reasonable alignment after considerable wear.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A pump unit including a housing embodying impeller means for drawing liquid thereto and delivering the same therefrom, with or without solids, means constituting an adapter for connection with a drive element of any one of a variety of engines, said impeller having a drive shaft in connection therewith and extending therefrom through a wall section of said pump housing, said adapter and said impeller drive shaft including portions formed to provide a male-female interfit producing a connection therebetween which inhibits their relative rotary motion, said connection being provided by a slip fit of one to the other, said interfitting portions defining a lubricant chamber constructed and arranged to accommodate and maintain a storage of lubricant for maintaining the operative condition of these parts and said adapter embodying a relief passage for escape of excess lubricant when said pump is inoperative, said passage being located to preclude escape of lubricant from said chamber and said connection when said pump is operating.

2. Apparatus as in claim 1 wherein said adapter includes a base plate formed for mount thereof to a drive element in the form of the flywheel of an engine.

3. Apparatus as in claim 1 wherein the portion of said interfitting means in connection with said adapter forms a socket for the interfitting of the outwardly projected end of said impeller drive shaft, and the inner wall of said socket and the outer surface of said impeller drive shaft embody means defining paired projections and grooves which extend in a sense longitudinally thereof in a substantially bearing relation to one another, arranged, however, to accommodate a pressured charge of lubricant therebetween.

4. A drive coupling for application between driving and driven devices, having particular application between a drive engine and pump, to effect a drive of the pump impeller, including telescoping coupling members one of which defines a hub open at one end to receive the other and having a closure portion at its opposite end, said members having means for a sliding interfit of one to the other to achieve a connection therebetween the form of which inhibits their relative rotary motion, providing for a rotary driving-driven relationship of said members, means for introducing a lubricant into said hub for lubricating said connection, and means for sealing against the escape of lubricant from said hub while said hub incorporates means for relieving the pressure of lubricant introduced to said hub in excess of that required for lubrication of said connection while substantially precluding lubricant loss from said connection during rotation of the drive coupling.

5. A drive coupling according to claim 4 wherein said relieving means defines a passage in said hub the entrance to which is out of the path of such flow of said lubricant as is induced by centrifugal forces during a rotation of said drive coupling.

6. A drive coupling according to claim 5 wherein said passage is formed in said end closure portion of said hub and opens into said connection on a line which is substantially axially of said hub.

7. A drive coupling according to claim 4 wherein said means for introducing a lubricant into said hub includes a fitting installed in the side of said hub, at a location intermediate the ends thereof.

8. A drive coupling according to claim 4 wherein said sealing means includes an O-ring seal received in said open end of said hub in a surrounding relation to a telescoping portion of said other member and said members and said seal define a chamber for receiving said lubricant and directing the same between said interfitting means.

9. A drive coupling for application between an engine device having a rotatable flywheel as a drive element thereof and a driven device adapted to be effected in the field in an operation by which one of said devices is brought to the other while the coupling is inherently effected in a relative approaching motion of said devices, said driven device including a relatively projecting rotary shaft member forming a part of the drive coupling and a coupling assembly arranged for the releasable fixing thereof to said drive element embodying in connection therewith a hub member forming the other part of said coupling, a shaft support assembly projecting from one of said devices including means for a temporary fixing of said shaft member against off center movements while it is relatively advanced upon said engine device to effect a drive coupling therebetween, said hub member receiving a projecting end of said rotary shaft, said shaft member being externally splined and said hub member having mating internal splines, said coupling assembly including a plate portion arranged for releasable fastening thereof to the flywheel, said hub member being connected with said plate portion to project perpendicularly thereof, means being provided for introducing lubricant to the interior of said hub member to lubricate the mating splines therein, means being provided for sealing said hub member against escape of lubricant, and said hub member having therein a continuously open excess lubricant relief passage communicating with the interior thereof, at least the entrance of which relief passage positions substantially axially of said hub member to inhibit loss of lubricant therethrough in the operation of the drive coupling.

10. An adapter facilitating the coupling of a pump, the impeller of which has an externally projected drive shaft, to any one of a variety of engines the drive shaft of which embodies a flywheel, comprising a hub-like device the base end of which is adapted for a fixed coupling to the engine flywheel and the opposite end of which defines a socket embodying means for a slip fit and bearing connection thereof with an impeller drive shaft the form of which inhibits relative rotary motion therebetween and means for sealing a chamber thereby defined between said hub-like device and the impeller drive shaft, said hub-like device further including means for loading thereof and said chamber with lubricant and means for escape from said chamber of excess lubricant the form and arrangement of which inhibits escape of lubricant when said hub is coupled to the impeller drive shaft and rotates therewith.

11. An adapter as in claim 10 wherein said hub-like device is comprised of a base plate projecting outwardly and peripherally of the closed end of a cup-like member.

12. An adapter as in claim 10 wherein said means for escape of excess lubricant is provided by a relief passage in said base end of said hub-like device at least a portion of which lies centrally of said base end.

13. An adapter as in claim 11 wherein said means for escape of excess lubricant defines a relief passage in said base end of said hub-like device at least a portion of which lies in its central axis and said relief passage communicates with the interior of said cup-like member at the center of its closed end.

14. An adapter as in claim 24 in combination with a pump the impeller of which has an externally projected drive shaft wherein said impeller drive shaft is formed for a slip fit mount in said socket the construction and arrangement of which prevents relative rotary motion therebetween and said sealing means is arranged in said socket between the inner wall thereof and said impeller drive shaft to form one end of said lubricant chamber in said hub-like device the opposite end of which is defined by a base closure portion of said hub-like device which forms the base of said socket.

15. A pump unit including a housing embodying impeller means for drawing liquid thereto and delivering the same therefrom, with or without solids, and means for establishing a drive coupling from any one of a variety of engines to said impeller means including telescoping coupling members one of which defines a hub open at one end to receive the other and closed at its opposite end, said members embodying means for a sliding interfit of one to the other to achieve a connection therebetween, the form of which inhibits their relative rotary motion and provides for a driving-driven relationship of said members, said hub having means for introducing therein a lubricant for lubricating said connection, and means for sealing against an escape of lubricant from the said open end of said hub and for relieving the pressure of lubricant introduced to said hub in excess of that required for lubrication of said connection while substantially precluding lubricant loss by way of said relieving means during drive of said impeller through said coupling means.

16. Apparatus as in claim 15, wherein said relieving means defines a passage in said hub which is out of the direct path of flow impulse of said lubricant as induced by centrifugal forces during a rotation of said drive coupling means.

17. Apparatus as in claim 16, wherein said passage is formed in the said opposite end of said hub and opens to said interfitting means on a line substantially axially of said hub.

18. Apparatus as in claim 15, wherein said means for introducing a lubricant into said hub includes a fitting installed in the side of said hub, at a location intermediate the ends thereof.

19. Apparatus as in claim 15, wherein said sealing means includes an O-ring seal received in said open end of said hub in a surrounding relation to a telescoping portion of said other member and said members and said seal define a chamber for receiving said lubricant and directing the same between said interfitting means.

20. A pump unit including a housing embodying impeller means for drawing liquid thereto and delivering the same therefrom, with or without solids, means for establishing a drive coupling from any one of a variety of engines to said impeller means, the connection of the parts of said drive coupling means being effected in a relative approaching motion of one of said pump unit and the engine to the other, said pump unit including a relatively projecting rotary shaft in a driving relation to said impeller means forming one part of said drive coupling means, a shaft support assembly projecting from said pump unit housing and including means for a temporary fixing of said shaft against off center movements while it is relatively advanced upon another part of said coupling applied in connection with the engine to effect said drive coupling, said parts of said coupling defining therebetween a lubricant chamber and one thereof including a relief passage for escape of excess lubricant from said chamber which is constructed and arranged to be inoperative when the pump is operating.

21. Apparatus as in claim 20, said drive coupling including as said another part thereof a cup shaped hub member arranged for a releasable operative connection with a drive element of the related engine, said shaft being externally splined and said hub member having mating internal splines, a relative approaching motion of one of said shaft and said hub member to the other achieving a telescoping relation therebetween in which the splines thereon interfit.

22. Apparatus as in claim 21, wherein teeth formed by the splines on said shaft have an involute configuration providing self-centering and support for said shaft in said hub.

23. Apparatus as in claim 20, wherein said shaft support assembly includes a ring portion in a relatively projected relation to said pump unit housing, through which ring portion said shaft projects in a radially spaced relation thereto, and said means for temporarily fixing said shaft includes a circumferential arrangement of holding elements connected with said ring portion and engageable to said shaft.

* * * * *

UNITED STATES PATENT AND TRADEMARK OFFICE
CERTIFICATE OF CORRECTION

PATENT NO. : 4,272,224
DATED : June 9, 1981
INVENTOR(S) : Walter A. Kabele

It is certified that error appears in the above—identified patent and that said Letters Patent is hereby corrected as shown below:

Claim 14, line 1 (Col. 10, line 9), "24" is corrected to read -- 10 --.

Signed and Sealed this

Tenth Day of November 1981

[SEAL]

Attest:

GERALD J. MOSSINGHOFF

Attesting Officer

Commissioner of Patents and Trademarks